(12) United States Patent
Nakano et al.

(10) Patent No.: US 6,250,714 B1
(45) Date of Patent: *Jun. 26, 2001

(54) SEATBACK FOR AUTOMOBILE

(75) Inventors: Nobuyuki Nakano; Shigeki Hirabayashi, both of Kanagawa-ken (JP)

(73) Assignee: Ikeda Bussan Co., Ltd., Kanagawa-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/384,232

(22) Filed: Aug. 27, 1999

(30) Foreign Application Priority Data

Aug. 28, 1998 (JP) ................................. P10-243751
Aug. 28, 1998 (JP) ................................. P10-243752

(51) Int. Cl.⁷ .................................................. B60N 2/42
(52) U.S. Cl. ................................ 297/216.12; 297/216.13
(58) Field of Search ..................... 297/216.13, 216.12, 297/216.1, 284.4, 408

(56) References Cited

U.S. PATENT DOCUMENTS

| | | | |
|---|---|---|---|
| 5,378,043 | * | 1/1995 | Viano et al. ............. 297/216.12 X |
| 5,823,619 | * | 10/1998 | Heilig et al. ................. 297/216.12 |
| 5,884,968 | * | 3/1999 | Massara ....................... 297/216.12 |
| 5,927,804 | * | 7/1999 | Cuevas ......................... 297/216.12 |
| 5,938,279 | * | 8/1999 | Schubring et al. ........... 297/216.12 |
| 6,019,424 | * | 2/2000 | Rückert et al. ............... 297/216.12 |
| 6,024,406 | * | 2/2000 | Charras et al. .............. 297/216.138 |

FOREIGN PATENT DOCUMENTS

| | | |
|---|---|---|
| 0 627 340 A1 | 12/1994 | (EP) . |
| 2 318 045 | 4/1998 | (GB) . |
| 98 09838 | 3/1998 | (WO) . |

* cited by examiner

Primary Examiner—Peter R. Brown
(74) Attorney, Agent, or Firm—Nath & Associates PLLC; Gary M. Nath; Marvin C. Berkowitz

(57) ABSTRACT

There are provided a headrest; a seatback frame; a supporting member which was kept by the seatback frame, supports the headrest to be swung, and is arranged at least inside a shoulder point of AFO 5% tile mannequin from a front view thereof; and a pressure receiving member which is formed of a rigid body, is supported by the supporting member, and is to receive a predetermined pressure to swing the supporting member. Preferably, the pressure receiving member has a cross-sectional configuration formed in an almost U-shape, and is spaced from a back face of a pad arranged in front of the pressure receiving member.

7 Claims, 8 Drawing Sheets

SEATBACK FOR AUTOMOBILE

BACKGROUND OF THE INVENTION

1. Field of the Invention

The present invention relates to a seatback for an automobile, and particularly to a seatback structure for an automobile protecting the cervical vertebrae of a vehicle occupant when his/her own automobile is collided with another vehicle.

2. Description of the Relevant Art

As disclosed in International Patent 98/09838 Official Gazette, a conventional seatback for an automobile comprises at least a seatback frame, supporting means supported rotatably in forward and rearward direction at an upper end portion of the seatback frame, a headrest supported movably in a vertical direction at an upper end portion of the supporting means via a stay, a pressure receiving member supported at a lower end portion of the supporting means and receiving pressure from the back of a vehicle occupant, operating link rotatably pivoted to the seatback frame and the pressure receiving member, and a pad disposed ahead of the pressure receiving member.

Then, since the headrest instantaneously approaches to the head of an occupant in his/her automobile even when the seatback is flexed rearwardly by reaction load of the occupant at a time when his/her automobile is collided with another vehicle, the head of the occupant is securely received on the headrest, thereby protecting the cervical portion of the occupant.

SUMMARY OF THE INVENTION

In such a technique, however, there is a drawback that, when a horizontal portion of the supporting means positioned on the pressure receiving member is pivoted about a upper frame portion of the seatback frame as a pivoting fulcrum, the horizontal portion may interfere with a shoulder of the occupant. That is, as described above, there is a drawback that the supporting means is not rotated so that the headrest may be prevented from approaching to the head of the occupant.

Also, there is a drawback that since the pressure receiving member is made of cloth, it is flexed, so that a rearward load of the occupant may not be transmitted securely to the pressure receiving member, which results in delay of movement and reduction of an operation amount of the headrest. Such drawbacks are required to be improved.

Furthermore, in these conventional arts, there is a drawback that, since the pressure receiving member is made of cloth, rubbing noises may occur between the cloth and the pad, which is required to be improved for comfortability in the vehicle.

Also, there is a drawback that, as the pressure receiving member is made of cloth, a flexing amount thereof is increased so that rearward load of the occupant may not be securely transmitted to the pressure receiving member, which results in delay of movement and reduction of an operation amount of the headrest. Such drawbacks are required to be improved.

An object of the present invention is to provide a seatback for an automobile where a pad is prevented from biting a supporting member of a headrest, even when a rearward load from an occupant acts on a pressure receiving member, so that an operation amount of the headrest can be secured.

The present invention is to provide a seatback for an automobile where rubbing noises do not occur between the pressure receiving member and the pad, even when a rearward load from an occupant acts on the pressure receiving member, so that an operation amount of the headrest can securely be secured.

From a first aspect of the invention, there is provided a seatback for an automobile which comprises: a headrest; a seatback frame; a supporting member which was kept by the seatback frame, supports the headrest to be swung, and is arranged at least inside a shoulder point of AFO 5% tile mannequin from a front view thereof; and a pressure receiving member which is formed of a rigid body, is supported by the supporting member, and is to receive a predetermined pressure to swing the supporting member.

Preferably, a seatback further comprises an operation mechanism to move in a direction of the pressure the pressure receiving member to be restored in an original position.

Preferably, the operation mechanism comprises a operation link connected with the pressure receiving member and a elastic member to restore the pressure receiving member in the original position.

Preferably, the supporting member bends to the pressure receiving member.

Preferably, a seatback further comprises a holder which is fitted in the supporting member and keeps the headrest; and a lock mechanism which is opposed to the pressure receiving member and is to lock the headrest and the holder.

From a second aspect of the invention, there is provided a seatback for an automobile comprises: a headrest; a seatback frame; a supporting member which is kept by the seatback frame and supports the headrest to be swung; and a pressure receiving member which is formed of a rigid body, is supported by the supporting member, has a cross-sectional configuration formed in an almost U-shape, and is spaced from a back face of a pad arranged in front of the pressure receiving member.

Preferably, the pressure receiving member has a cross-sectional configuration formed not to interfere with a side portion of the seatback frame at a final position where the pressure receiving member has been moved by a predetermined pressure.

Preferably, the pressure receiving member has a cross-sectional configuration having a step portion in an inclined manner.

Preferably, the pressure receiving member is formed at an end opposed to the headrest with an inclination portion to slide a pad arranged on an occupant side.

DETAILED DESCRIPTION OF THE PROFFERED EMBODIMENTS

Figure 1:
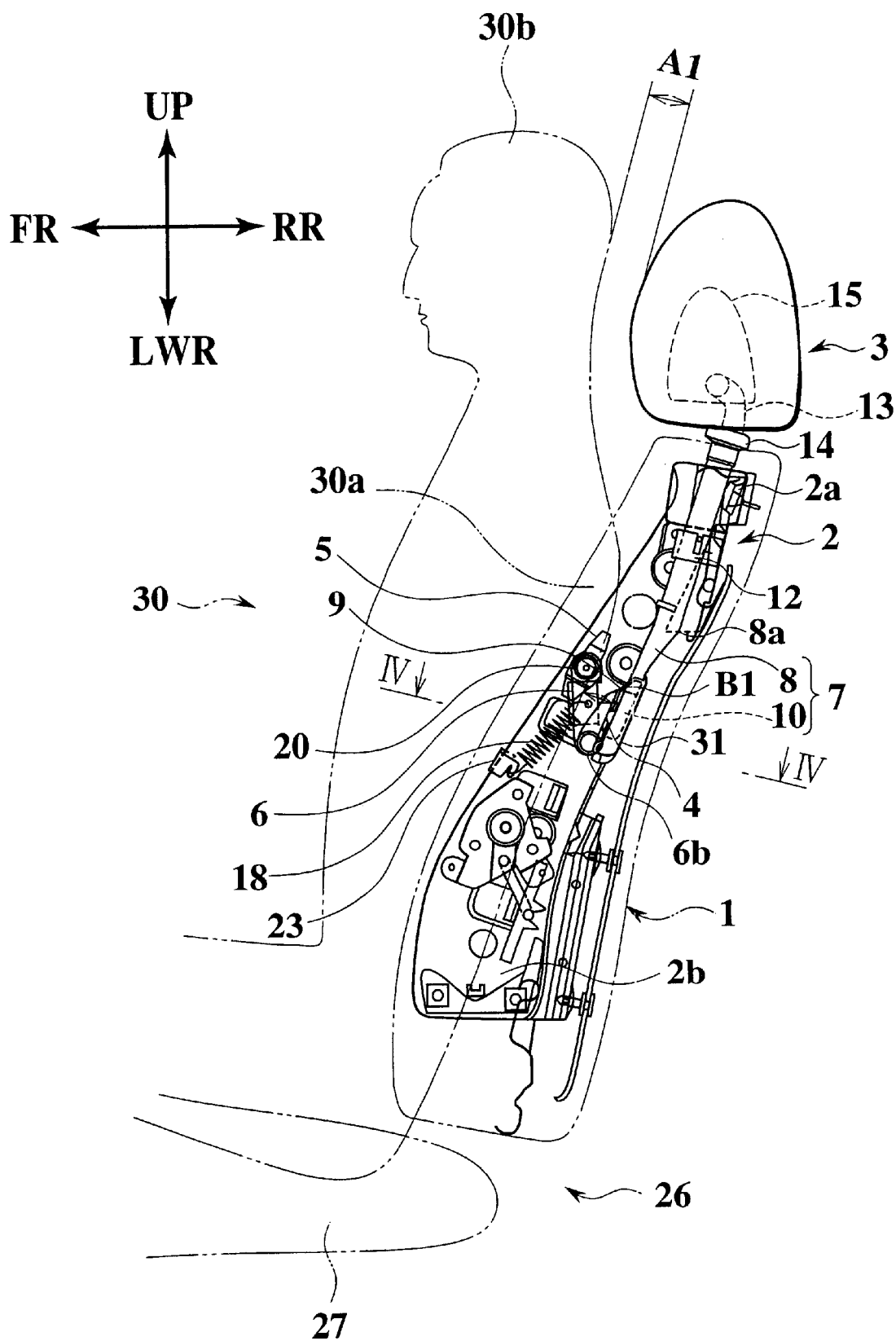
FIG. 1. is a side view showing a seatback according to the first embodiment of the present invention.

A preferred embodiment of the present invention will be explained below with reference to the drawings. In FIG., FR indicates a front side, RR indicates a rear side, UP indicates an upper side and LWR indicates a lower side.

First Embodiment

FIGS. 1 to 5 show an embodiment of the present invention, where reference numeral 1 denotes a seatback for an automobile and 3 denotes a headrest.

The seatback 1 is composed of at least a seatback frame 2, pads (not shown) formed of polyurethane foam and disposed at a front side and a rear side of the seatback frame 2, and an outer skin made of cloth for covering the pads or the like.

The seatback frame 2 comprises an upper frame 2a formed in an inverse U-shaped configuration where its one leg portion is long and the other leg portion is short (for securing a space for attaching an airbag apparatus (not shown)), left and side symmetrical side frames 2b disposed at positions suspended from left and right end portions of the upper frame 2a and an under frame 2c bridged between lower end potions of the side frames 2b.

Brackets 5, each being formed of a steel plate in a plate shape, are respectively on the side frames 2b. One end portions 6a of operation links 6 are respectively supported rotatably in front and rear directions at the brackets 5 through bolts 20 and bushes 21. End portions 6a of a pressure receiving member 4 described later are rotatably supported to the other end portions 6b of the operation links 6 via rivets 22 and bushes 21.

Coil springs 18 serving as biasing means are disposed between spring hooks 23 of the side frames 2b and the operation links 6, and they always bias the other end portions 6b of the operation links 6 in the front direction FR.

Figure 4:
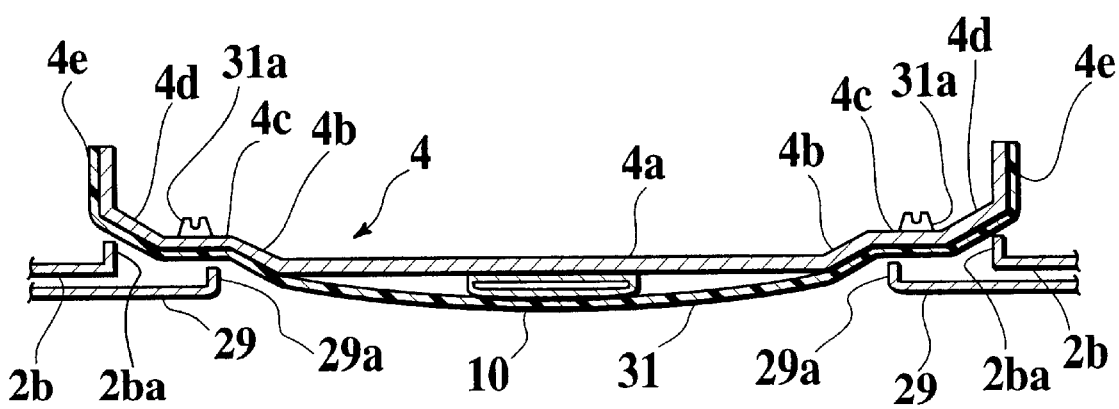
FIG. 4. is a side view taken along line IV—IV in FIG. 1.

The pressure receiving member 4 is made of such a rigid body as a steel plate and formed in a rectangular shape extending in left and right directions. In an sectional configuration, as shown in FIG. 4, the pressure receiving member 4 is formed in an almost U-shape with a planer central portion 4a supported with a turned-back portion 10 (having flat faces at the front and rear sides) of an armature pipe 7 (described later) serving as a supporting member, planer first side portions 4c positioned at the front side FR from the central portion 4a via first stepped portions 4b formed in an inclined manner so as not to interfere with flanges 29a formed so as to project ahead of backboard trim brackets 29 respectively supported on the side frames 2b, and flange-shaped second side portions 4e positioned on the front side via second stepped portions 4d formed in an inclined manner so as not to interfere with flanges 2ba formed so as to project ahead of backboard trim brackets 29, respectively. The pressure receiving member 4 is spaced from a back face of the pad.

Namely, the cross-sectional shape of the pressure receiving member 4 is formed in a configuration where the pressure receiving member 4 does not interfere. with the side frames 2b which are both side portions of the seatback frame 2 and the backboard trim brackets 29, when it is moved at a rearmost position by pressure from the back 30a of a vehicle occupant 30, as shown in FIG. 4.

Figure 2:
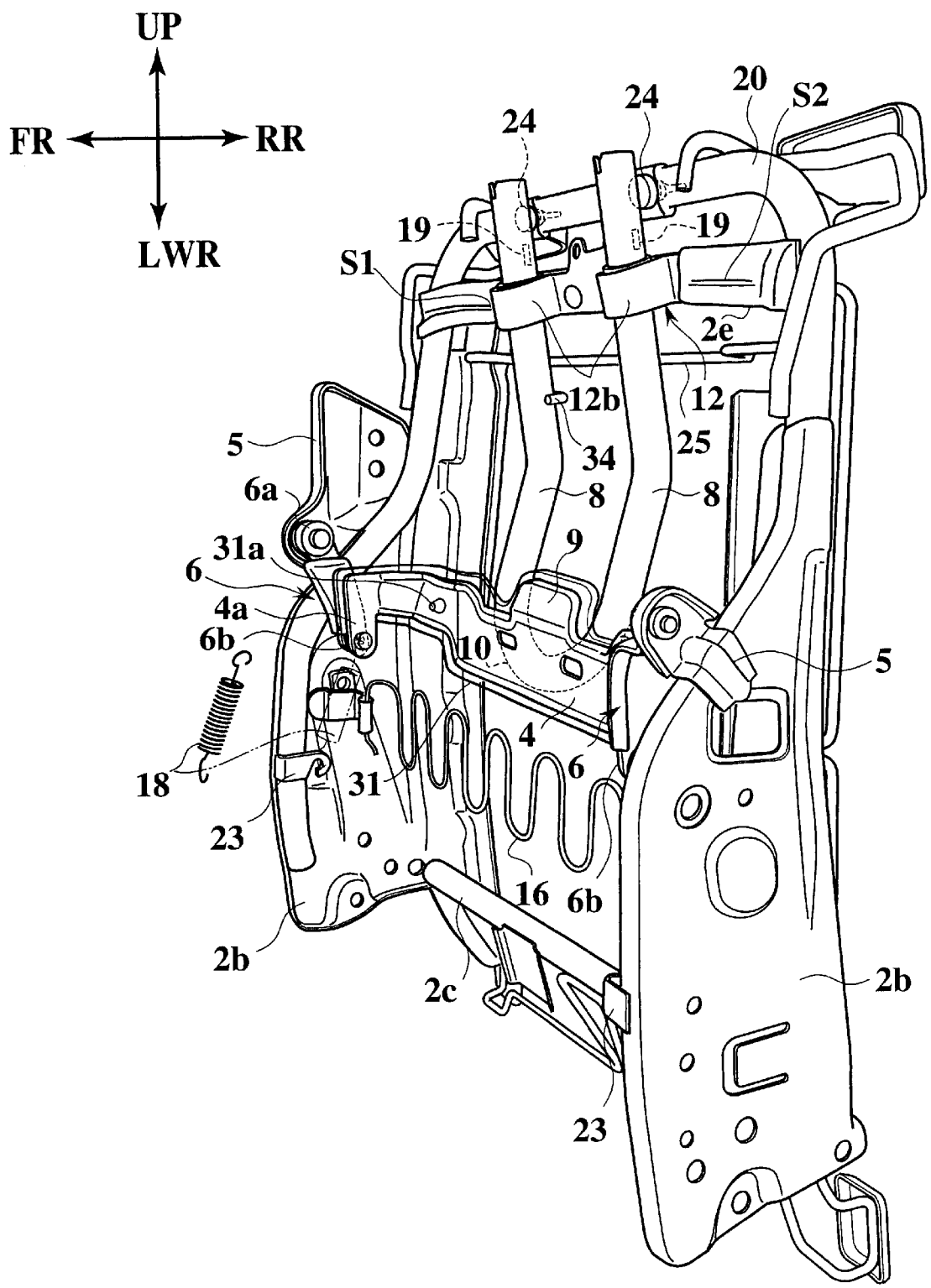
FIG. 2. is a perspective view showing a main portion of the seatback shown in FIG. 1.
Figure 3:
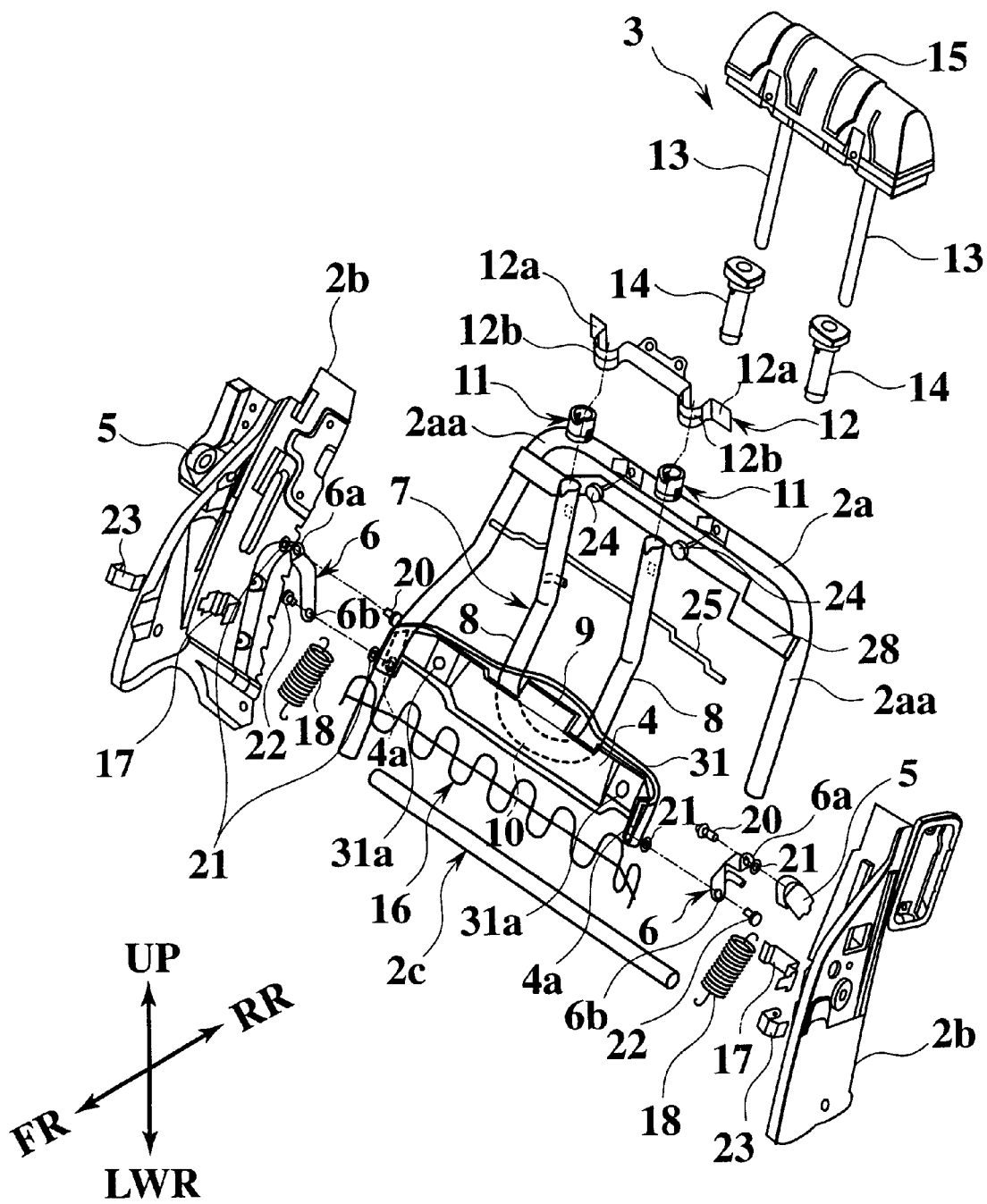
FIG. 3. is an exploded perspective view of a main portion of the seatback shown in FIG. 1.

Also, as shown FIGS. 2 and 3, an inclination portion 9 formed in a standing manner so as to be opposed to the headrest 3 is provided at a central portion 4a of the pressure receiving member 4, particularly at a portion thereof positioned between holding portions 8 of the armature pipe 7 serving as a supporting member.

The turned-back potion 10 of the armature pipe 7 having front and back faces formed in a planer shape is fixed to a central portion of the pressure receiving member 4 by gas welding.

A protector 31 made of synthetic resin and formed so as to cover a whole back face of the pressure receiving member 4 is disposed on a back face side of the pressure receiving member 4 so as to be spaced from the pressure receiving member 4. Clips 31a of the protector 31 are engaged with edges of openings (not shown) formed in the pressure receiving member 4 so that the protector 31 is supported to the pressure receiving member 4. The protector 31 is structured so as to bear a load from the rear side RR of the pressure receiving member 4, for example a load imparting by kicking of a rear seat occupant on a back side face of a front seat or his/her own seat or the like. Also, in a vertical section of the protector 31, the protector 31 is flanged at its upper portion towards the pressure receiving member 4, it generally extends along the pressure receiving member 4, and it is formed at a lower end portion in a curved manner.

As shown in FIG. 3, a second frame 28 bridging shoulder portions of the upper frame 2a is fixed at a lower side of the upper frame 2a by welding. A holder bracket 12 is disposed at a central portion of the second frame 28, and both end portions 12a of the holder bracket 12 is supported thereat by welding. Armature holders 11 are respectively disposed insides supporting portions 12b positioned so as to be spaced from the central portion of the holder bracket 12, each supporting portion 12b being formed in a U-shaped sectional configuration so as to bulge to the front side. Since the armature holders 11 are respectively supported to upper end portions of the holding portions 8 of the armature pipe 7, the holding portions 8 are supported by the supporting portions 12b of the holder bracket 12 through the armature holders 11.

The armature pipe 7 is formed in an almost U-shaped configuration by the holding portions 8 extending vertically and positioned side by side, as viewed from the front, and the turned-back portion 10 formed so as to connect lower end portions of the holding portions 8 to each other.

As shown in FIG. 2, The holding portions 8 are arranged at least inside the shoulder points S1, S2 of AFO 5% tile mannequin (dummy). Such an arrangement means that the holding portions 8 are positioned inside the shoulder points S1, S2 of almost all occupants 30 having a normal adult physique. Therefore, even when a load from the front side of the seatback frame 2 acts on the occupant 30 due to a rear end collision of his/her own automobile, his/her shoulders do not interfere with the holding portions 8.

Also, as shown in FIGS. 2 and 3, the holding portions 8 are formed to be bent towards the pressure receiving member 4 side such that the pressure receiving member 4 is positioned ahead of the holding portions 8. The bent portions 8a are formed at portions of the holding portions 8 which are near to stays 13 of the headrest 3 but do not interfere with the stays 13. An inner face of each bent portion 8a has a radius of 20 mm.

Furthermore, as mentioned above, the stays 13 of the headrest 3 are supported slidably in a vertical direction in the holding portions 8 via the synthetic resin-made armature holders 11. Headrest holders 14 made of synthetic resin and allowing vertical position adjustment of the stays 13 are held at upper end portions of the holding portions 8. Reference numeral 14*a* denotes an engaging portion of the headrest holders 14 and 15 denotes a frame of the headrest 3.

An S-shaped spring 16 is supported at its both ends to the side frames 2*b* via hooks 17, and it is arranged at a position below the pressure receiving member 4.

The holding portions 8 are respectively formed at their rear faces with opening portions 19, as shown in FIGS. 2 and 3. When such a tool as a screw driver is inserted to each opening portion 19, the engaging portion 14*a* of the headrest holder 14 engaged with the opening portion 19 is pushed to be disengaged from the opening portion 19 so that the holding portion 8 can be pulled out. That is, the headrest holder 14 is allowed to log off.

First rubber-like stoppers 24 are supported to the upper frames 2*a* at the rear side RR of the holding portions 8, so that the upper portions of the holding portions 8 are prevented from being pivoted towards the rear side RR beyond this rear side RR position. A frame 25 for hooking is hooked to a backboard (not shown), and a second stopper 34 is arranged on one of the holding portions 8. The second stopper 34 formed in a wire shape prevent the upper end portions of the holding portions 8 from pivoting towards the front FR beyond the position of the second stopper 34.

Next, operation of the embodiment will be explained.

As shown in FIG. 1, in an ordinary state where the occupant 30 sits on a seat cushion 27 of a seat 26 and his/her back 30*a* rests on a seatback 1, there is a slight clearance A1 between the head 30*b* of the occupant 30 and the headrest 3, and there is also a slight clearance B1 between the back 30*a* of the occupant 30 and the pressure receiving member 4. However, a pad and/or an outer skin (not shown) is interposed between the back 30*a* of the occupant 30 and the pressure receiving member 4, and a load from the occupant 30 is not transmitted to the pressure receiving member 4.

In this state, since the pressure receiving member 4 is formed of a rigid body, the sectional configuration thereof is formed in the almost U-shape, and it is spaced from the back face of the pad, the existing feeling of the pressure receiving member 4 is not given to the occupant 30 via the pad until a load in the rear side RR from the occupant 30 occurs. Namely, foreign feeling is not given to the occupant 30 from the pressure receiving member 4.

Since the protector 31 bearing the pressure receiving member 4 against a load from the rear side RR is disposed on the rear face side of the pressure receiving member 4 so as to be spaced from the pressure receiving member 4, the pressure receiving member 4 is not moved towards the front side FR, even when a load is generated by a rear seat occupant from the rear side RR. Namely, an occupant siting on his/her own seat can be secured much safely.

Also, even when the headrest 3 is moved towards the front side FR, i.e., the pressure receiving member 4 is moved towards the rear side RR, the holding portions 8 of the armature pipe 7 of the headrest 3 are prevented from projecting to the rear side RR. That is, the safety of the rear seat occupant is further secured.

Since the protector 31 is held by the pressure receiving member 4, a clearance between the protector 31 and the pressure receiving member 4, so that tuning for a load acting from the rear side RR can easily be performed. That is, the clearance between the protector 31 and the pressure receiving member 4 can be made larger or smaller on the basis of a load value.

The protector 31 has a longitudinal sectional configuration approximately conforming to the pressure receiving member 4, and it is formed at its lower end portion in a curved face. Therefore, even when the lower end portions of holding portions 8 of the armature pipe 7 of the headrest 3 project towards the rear side RR, a safety of a rear seat occupant is maintained higher, as the protector 31 has the curved face at the lower end portion.

In this state, when an automobile of the occupant 30 is collided with another vehicle from behind and the occupant 30 sitting on his/her seat is pressed towards the rear side RR due to a secondary collision so that the pad or the like is moved, the pressure receiving member 4 is pressed to the rear side RR by the back 30*a* of the occupant 30 through the pad or the like.

At this time, even when the pad or the like is moved to the rear side RR by a load acting in the rear side RR direction due to the occupant 30, as the pressure receiving member 4 receiving the load is a rigid body, rubbing noises are not only prevented from being generated between the pressure receiving member 4 and the pad but also the load acting in the rear side RR direction due to the back 30*a* of the occupant 30 is securely transmitted to the headrest 3. That is, the headrest 3 is moved immediately after the load is imparted on the pressure receiving member 4, thereby eliminating a timing loss. In addition thereto, the movement amount of the pressure receiving member 4 is increased.

Since a loading point of the pad disposed a position opposed to the holding portions 8 of the armature pipe 7 regarding movement where the holding portions 8 tend to rotate to move to the upper side UP against the load acting upon the rear side RR is at least the shoulder point S1, S2 regarding the AFO 5% tile dummy, the pad or the like is prevented from biting in the holder portions 8 of the armature pipe 7. Accordingly, the holding portions 8 are not prevented moving upwardly due to rotation thereof, so that a sufficient operation amount of the headrest 3 can be secured.

Also, the pressure receiving member 4 is formed of a rigid body, the load acting in the rear side RR from the occupant 30 is securely transmitted to the holding portions 8. Namely, since the headrest 3 is moved immediately after the load is imparted on the pressure receiving member 4, thereby eliminate a timing loss. Also, the movement amount of the pressure receiving member 4 is increased.

Figure 6:
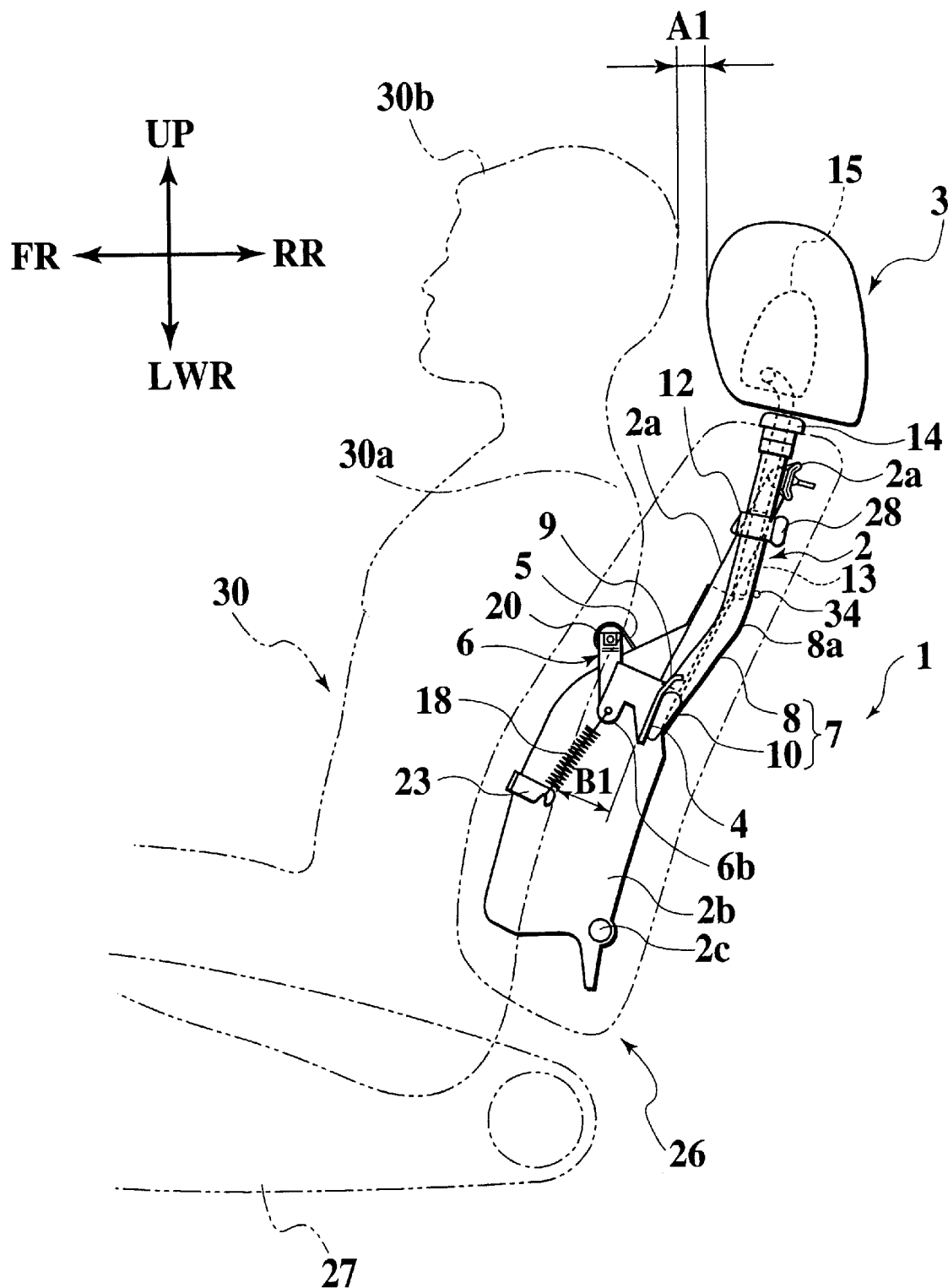
FIG. 6. is a side view showing the seatback according to the second embodiment of the invention.

The operation links 6 supporting the pressure receiving member 4 are biased to be rotated about the bolts 20 so that the other end portions 6*b* of the operation links 6 are moved from positions shown in FIG. 1 to positions shown in FIG. 6, so that the other end portions 6*b* of the operation links 6 are rotated about the bolts 20 to the upper side UP and the rear side RR directions.

Thus, when the other end portions 6*b* of the operation links 6 are rotated to the upper side UP and the rear side RR, the lower end portion, i.e., the turned-back portion, of the armature pipe 7 are moved to the upper side UP and the rear side RR. According to the movement, the headrest holders 14 together with the upper end portions of the armature pipe 7, i.e., the upper end portions 8*b* of the holding portions 8, are moved to the upper side UP and the front side FR. According to this movement, the stays 13 of the headrest 3 are also moved to the upper side UP and the front side FR.

Figure 5:
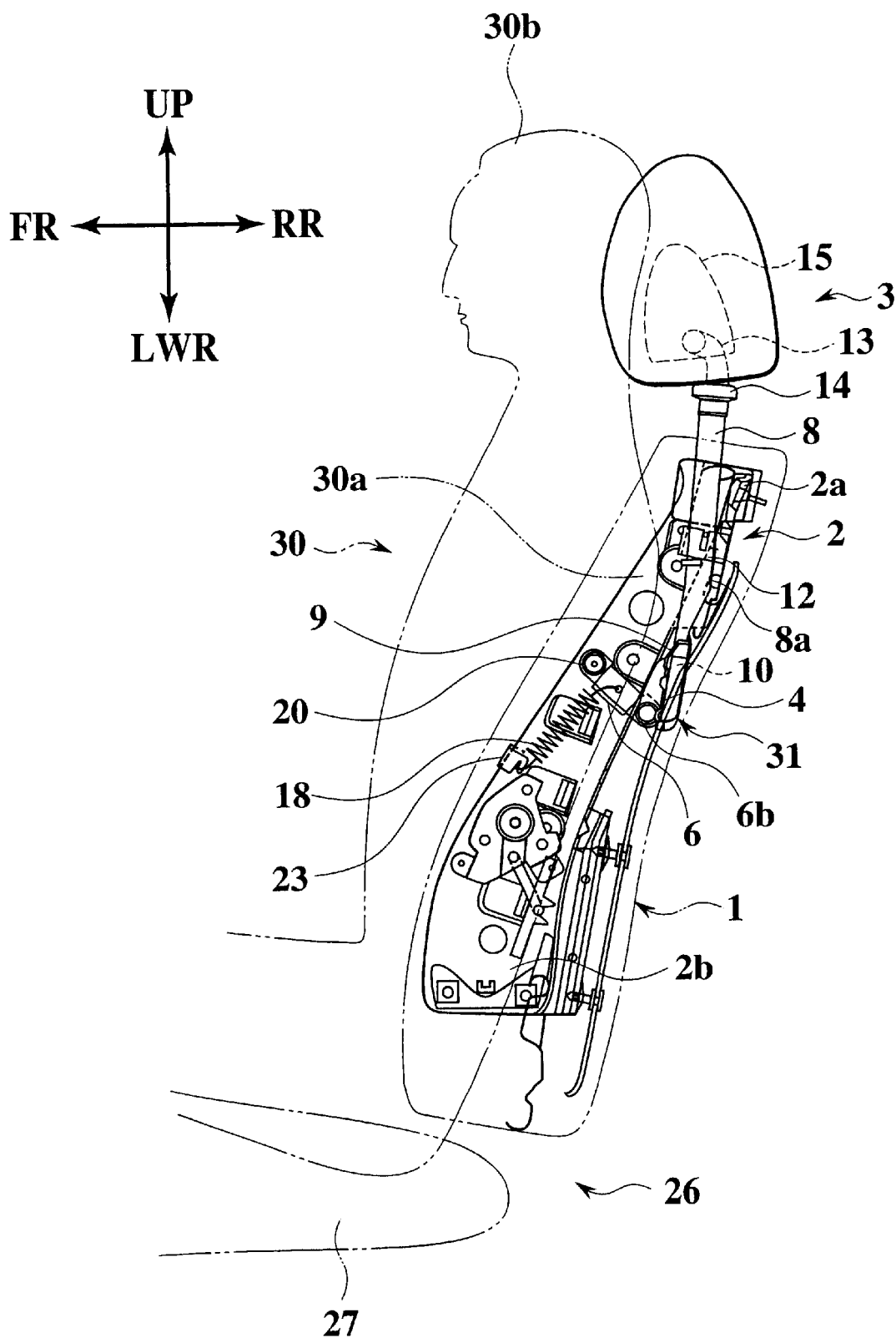
FIG. 5. is a cross section showing an operation of the embodiment shown in FIG. 1 put in a used state.

Accordingly, the holding portions 8 and the stays 13 are rotated together about the holder bracket 12. The headrest 3 supported by the stays 13 are brought into contact with the head 30*b* of the occupant 30, as shown in FIG. 5. In FIG. 5, the headrest 3 appears to bite into the head 30*b* of the occupant 30. However, since the headrest 3 is recessed at its central portion and the head 30b of the occupant 30 is formed in a circular shape in cross-sectional configuration, as is well known, the headrest 3 does not bite into the head 30b.

In this manner, the upper half of the occupant 30 is moved to the rear side RR so that the head 30b of the occupant 30 behaves to remain at its original position, but the head 30b is securely held by the movement of the headrest 3. At this time, since the inclination portion 9 rising up to the rear side RR is formed at the upper edge of the pressure receiving member 4, the inclination face 9 of the pressure receiving member 4 can smoothly be moved along the rear face of the pad. In other words, it is hard for the pressure receiving member 4 to bite into the pad.

In this state, the cross-sectional configuration of the pressure receiving member 4 is formed so as not to interfere with the side frames 2b which are the side portions of the seatback frame 2 and the backboard trim brackets 29 at a final position where the pressure receiving member 4 has been moved by pressure of the back 30a of the occupant 30. Thus, as shown in FIG. 4, the pressure receiving member 4 does not interfere with the side frames 2b which are the side portions of the seatback frame 2 when the pressure receiving member 4 is moved to the rear side RR.

In the state, as the holding portions 8 are each formed in a bent configuration toward the side of the pressure receiving member 4 and the back face of the turned-back 10 is covered with the protector 31, the pressure receiving member 4 and the turned-back portion 10 do not project to the rear side RR, as shown in FIG. 5, when the pressure receiving member 4 is moved to the rear side RR.

Also, when such a tool as a screw driver is inserted into each opening portion 19 provided on the back face of each holding portion 8, the engaging portion 14a of the headrest holder 14 engaged with the opening portion 19 is disengaged from the opening portion 19, so that each headrest holder 14 can be pulled from the holding portion 8. Namely, each headrest holder 14 is allowed to log off.

Furthermore, since the respective stays 13 of the headrest 3 are supported to the headrest holders 14 movably in a vertical direction, the headrest 3 can be caused to appropriately conform to the position of the head 30b of the occupant 30.

Also, since the springs 18 biasing the pressure receiving member 4 to the front side FR are interposed between the operation links 6 and the side frames 2b of the seatback frame 2, the pressure receiving member 4 is positioned at the front side FR by the springs 18 in a state where pressing force in the rear side RR direction from the back 30a of the occupant 30 is not imparted to the pressure receiving portion 4. That is, since the headrest 3 supported on the upper ends of the holding portions 8 of the armature pipe 7 supporting the pressure receiving member 4 at the lower end is moved at the rear side RR position owing to a seesaw principle, a comfortability of the occupant 30 is not injured in an occupant compartment of the automobile.

The armature pipe 7 is not limited to this embodiment where it is formed in a U-shape with the holding portions 8 and the turned-back portion 10. For example, the armature pipe 7 may be structured such that the turned-back portion 10 is not provided and the lower end portions of the holding portions 8 are directly supported to the pressure receiving member 4 by welding.

In the above embodiment, the operation has been explained such that the head 30b of the occupant 30 is securely held by the movement of the headrest 3. Of course, the above explanation of the operation includes a case where the movement of the headrest 3 and the movement of the seatback 1 are relative to each other, and the headrest 3 is not moved relative to the head 30b of the occupant to remain at its position even when the seatback 3 is moved to the rear side RR by the back 30a of the occupant 30 so that the head 30b of the occupant 30 is protected.

According to the present embodiment, the armature pipe 7 serving as the supporting member is disposed at least inside the shoulder points S1, S2 of the AFO 5% tile dummy or the occupant in a front view. Therefore, since the shoulder points of the occupant correspond to at least the shoulder points of the AFO 5% tile dummy even when the pad is moved to the rear side by the load given in the rear side by the occupant, the armature pipe 7 is prevented from biting into the pad. For this reason, the headrest 3 is not prevented from rising up according to rotation of the armature pipe 7, and the operation amount of the headrest 3 can sufficiently be secured.

Also, since the pressure receiving member 4 is made of a rigid body, the load acting in the rear side direction by the occupant is securely transmitted to the pressure receiving member 4. Namely, as the pressure receiving member 4 is moved immediately when a load acts on the pressure receiving member 4 by the movement of the headrest, a timing loss does not occur. Also, the movement amount of the pressure receiving member 4 is increased.

Furthermore, since the armature pipe 7 is formed in a configuration where it is bent towards the pressure receiving member 4 side, the pressure receiving member 4 does not project to the rear side when it is moved to the rear side.

Also, when log-off is. performed behind the armature pipe 7, the headrest holders 14 supporting the headrest 3 can easily be detached.

Since the pressure receiving member 4 is made of a rigid body, the cross-sectional configuration thereof is formed in a U-shape, and the pressure receiving member 4 is spaced from the rear face of the pad, an existence feeling of the pressure receiving member 4 is not given to the occupant until a load acting in the rear side direction is produced by the occupant. Namely, the pressure receiving member 4 does not give a foreign feeling to the occupant.

Also, since the pressure receiving member bearing the load is made of the rigid body, no rubbing noises is not only generated between the pad and the pressure receiving member but also the load acting in the rear side direction by the back of the occupant is securely transmitted to the headrest 3 when the pad is pressed to be moved to the rear side. That is, the headrest 3 is moved immediately after the load is imparted on the pressure receiving member 4 thereby eliminating a timing loss. In addition thereto, the movement amount of the pressure receiving member 4 is increased.

Also, since the cross-sectional configuration of the pressure receiving member 4 is formed so as not to interfere with the side frames 2b of the seatback frame at a final position where the pressure receiving member 4 has been moved by pressure of the back of the occupant, the pressure receiving member 4 does not interfere with the side frames 2b when it is moved to the rear side.

Furthermore, since the inclination portion 9 slidable on the face of the pad is formed at the upper end portion of the pressure receiving member 4, i.e., the end portion opposed to the headrest 3, a smooth slide of the pressure receiving member 4 on the pad is secured.

Second Embodiment

Figure 7:
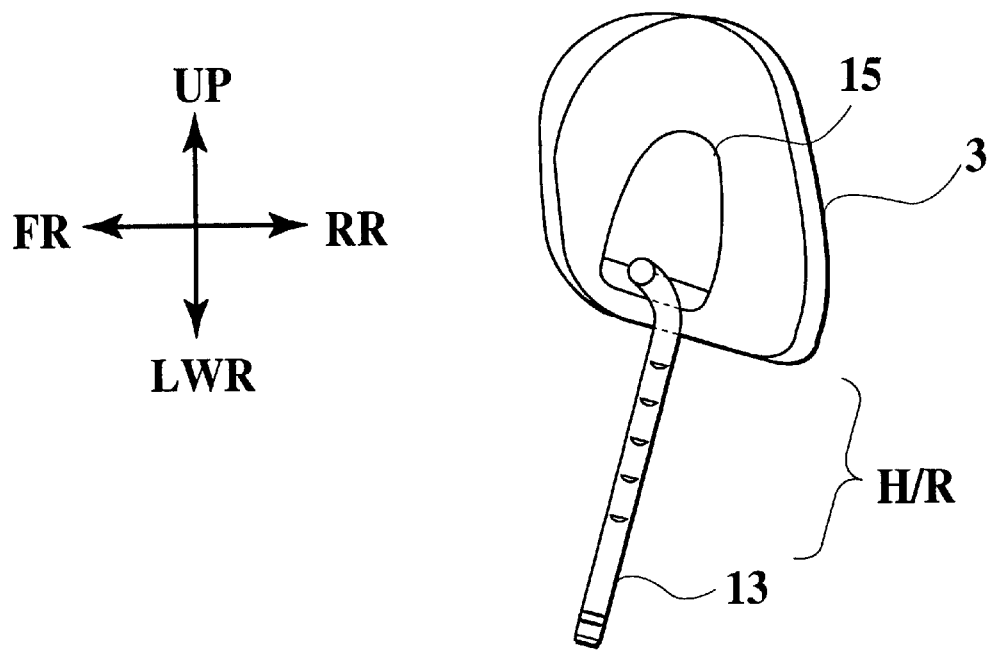
FIG. 7. is a cross section showing a relationship among a headrest, an armature pipe, a pressure receiving member, and an operation shown in FIG. 6.
Figure 7:
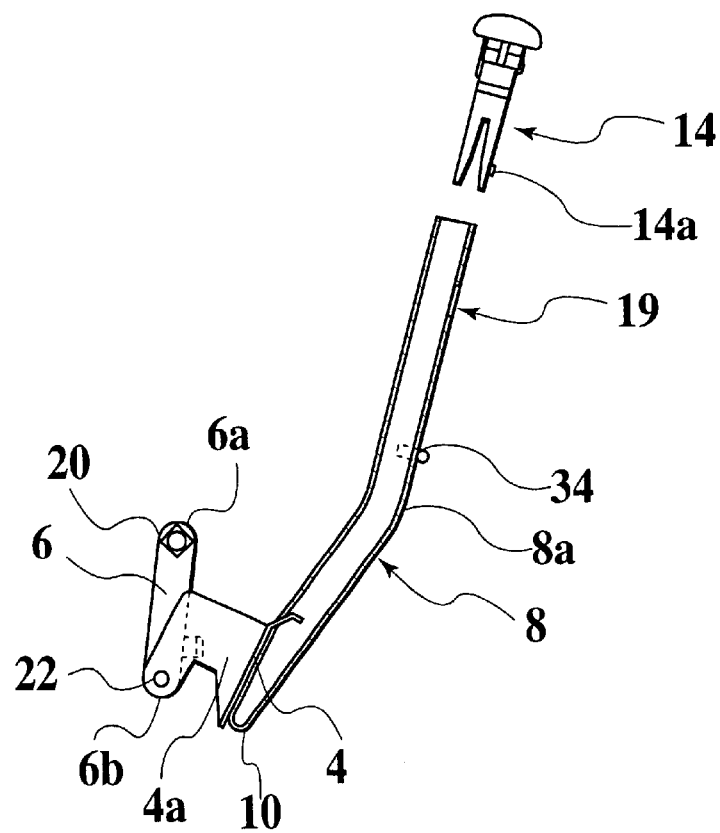
Figure 8:
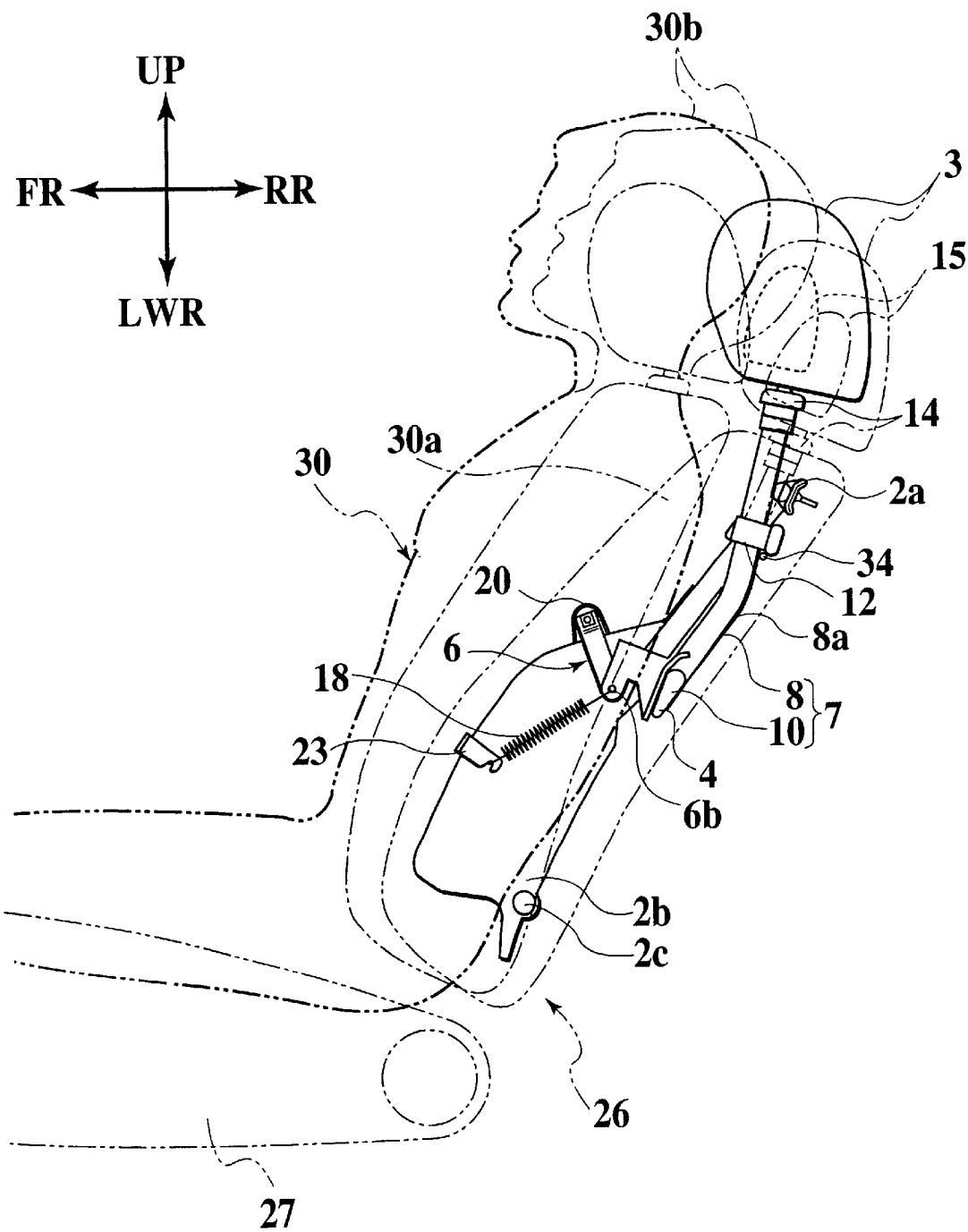
FIG. 8. is a side view showing an operation of the embodiment shown in FIG. 6 put in a used state.

A second embodiment shown in FIGS. 6 to 8 has the almost same structure as the first embodiment. Same element are given same reference characters, and detail explanation to them is omitted.

Also, in FIG. 8, there is the headrest shown with a double dotted line and indicated by reference numeral 3, and the headrest 3 shown with the double dotted line shows a position of the headrest 3 in a case where it is not moved. In such a case, the head 30b of the occupant 30 is moved as shown with a fine double dotted line.

While preferred embodiments of the present invention have been described using specific terms, such description is for illustrative purposes, and it is to be understood that changes and variations may be made without departing from the spirit or scope of the following claims.

What is claimed is:

1. A seatback for an automobile comprising:

a seatback frame including a pair of side members, and a cross-member between the side members;

a headrest movably mounted on the cross-member;

a pressure receiving member of a rigid body, the pressure receiving member being provided between the side members;

a link provided between the pressure receiving member and one of the side members, the link including a Divotal element rotatably supported by the one of the side members, the link being connected to the pressure receiving member, the link to pivot on the pivotal element; and a supporting member provided between the head rest and the pressure receiving member, the supporting member including a first part supported by the pressure receiving member, the first part to pivot rearwardly on the pivotal element through the link with the pressure receiving member to move close to the cross-member, the supporting member including a second part supporting the headrest and extending to the first part, the second part slidably and pivotably engaging with the cross-member, the second part to pivot forwardly on the cross-member, being slid relative to the cross-member for moving the headrest apart from the cross member.

2. A seatback according to claim 1, further comprising:

a resilient member provided between the one of the side members and one of the link and the pressure receiving member.

3. A seatback according to claim 1, wherein the supporting member further comprises:

a holder part fitted in the second part and for inserting the headrest, the holder part being releasably locked with a rear end of the second part.

4. A seatback according to claim 1, wherein the pressure receiving member includes:

a body fixed to the first part; and a side part extending from the body on one side of the body, the side part being connected to the link.

5. A seatback according to claim 4, wherein the pressure receiving member further includes an inclined part extending from the body toward the cross-member, the inclined part being included relative to the body on another side of the body.

6. A seatback according to claim 4, wherein the side part includes a proximal end inclined relative to the body on the one side of the body.

7. A seatback according to claim 1, wherein the supporting member includes a third part bent rearward between the first part and the second part.

* * * * *

UNITED STATES PATENT AND TRADEMARK OFFICE
CERTIFICATE OF CORRECTION

PATENT NO. : 6,250,714 B1
DATED : June 26, 2001
INVENTOR(S) : Nobuyuki Nakano et al.

It is certified that error appears in the above-identified patent and that said Letters Patent is hereby corrected as shown below:

Claim 1,
Line 10, "divotal" should be -- pivotal --

Signed and Sealed this

Fifteenth Day of January, 2002

*Attest:*

JAMES E. ROGAN
*Attesting Officer*   *Director of the United States Patent and Trademark Office*